United States Patent Office 2,816,921
Patented Dec. 17, 1957

2,816,921

PRODUCTION OF ALPHA-ALKOXY ALKANOIC ACIDS

James H. Gardner, Weston, Mass., assignor, by mesne assignments, to Escambia Chemical Corporation, Pace, Fla., a corporation of Delaware No Drawing. Application August 25, 1955, Serial No. 530,619

7 Claims. (Cl. 260—535)

This invention relates to the production of valuable chemicals and in particular to the production of alpha alkoxy carboxylic acids.

A principal object of the present invention is to provide a new process for making alpha alkoxy carboxylic acids from alpha nitratocarboxylic acids.

Another object of the invention is to provide a process for making alpha methoxyisobutyric acid from alpha nitratoisobutyric acid.

Still another object of the invention is to provide a process for making methacrylic acid and esters thereof from alpha nitratoisobutyric acid.

Other objects of the invention will in part be obvious and will in part appear hereinafter.

The invention accordingly comprises the process involving the several steps and the order and the relation of one or more of such steps with respect to each of the others which are exemplified in the following detailed disclosure, and the scope of the application of which will be indicated in the claims.

For a fuller understanding of the nature and objects of the invention, reference should be had to the following detailed description.

A particular aspect of the present inventon is directed to the production of alpha alkoxy carboxylic acids by reacting at elevated temperatures an alpha nitratocarboxylic acid with an alcohol. The resultant alpha alkoxy carboxylic acid may be esterified to give the corresponding esters thereof, or the alcohol incorporated therein may be removed so as to produce the corresponding unsaturated acid. The alpha alkoxy carboxylic acid may also be subjected to both an esterification and alcohol removal step to produce the corresponding esters of the unsaturated acid. In one preferred embodiment of the invention, alpha nitratoisobutyric acid is reacted with methanol at elevated temperatures to produce alpha methoxyisobutyric acid. The resultant alpha methoxyisobutyric acid may subsequently be esterified to produce the corresponding esters thereof or methanol may be removed therefrom to produce methacrylic acid. The alpha methoxyisobutyric acid may also be subjected to both a suitable esterification and methanol removal to produce esters of methacrylic acids such as methyl methacrylate.

Specific detailed methods of practicing the present invention are set forth in the following non-limiting examples.

*Example I*

173 grams of alpha nitratoisobutyric acid were added to about 800 cc. of methanol. The methanol solution of the alpha nitratoisobutyric acid was neutralized with about 110 cc. of 10 N methanolic potassium hydroxide to give a methanolic solution of potassium alpha nitratoisobutyrate. The resulting solution was refluxed at about 65° C. for four hours. Upon completion of the reaction, the potassium nitrate formed was filtered off. The solution was then made alkaline with a sodium hydroxide solution and the methanol was removed by distillation. The residual aqueous solution was then acidified and extracted with ethyl ether. This extract was dried over magnesium sulfate, filtered, then distilled, yielding 100 grams of a cut boiling at 116°–117° C. at 28 mm. Hg abs., the boiling point for alpha methoxyisobutyric acid under these conditions. A yield of about 73 percent of alpha methoxyisobutyric acid based on alpha nitratoisobutyric acid was thus obtained. The above reaction proceeded as follows:

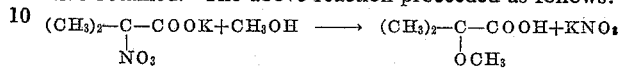

Methyl alpha methoxyisobutyrate was prepared using the general method of Clinton and Laskowski (Journal American Chemical Society 70, 3135 (1943)). In this procedure, 95.8 grams of the alpha methoxyisobutyric acid were refluxed with 80 grams of methanol in the presence of 305 cc. of ethylene dichloride solvent for 19 hours. 25 grams of Amberlite IR 120 cation exchange resin in the acid form was used as catalyst. Upon completion of the refluxing, the products were worked up by filtering off the catalyst and then drying the solution with anhydrous magnesium sulfate. The ethylene dichloride solvent was then removed azeotropically with methanol. The methyl alpha methoxyisobutyrate was separated by distillation at 135°–137° C. 90.3 grams of methyl alpha methoxyisobutyrate were recovered, thus giving a yield of about 84.5 percent based on alpha methoxyisobutyric acid. The above reaction proceeded as follows:

Methyl methacrylate was prepared using one procedure outlined by Weizmann in British Patent 584,607. In this procedure, 13 grams of the methyl alpha methoxyisobutyrate were vaporized and passed over an alumina catalyst maintained at a temperature of from about 245°–265° C. to remove methanol derived primarily from the methoxy radicle. The resulting effluent gas stream was cooled to condense the reaction products therein. A yield of 65 percent of methyl methacrylate based on the converted methoxy ester was obtained. The above reaction proceeded as follows:

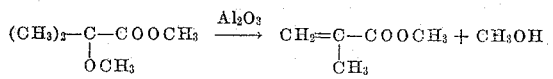

*Example II*

Potassium isopropoxide, prepared by reacting 52 grams of 85 percent potassium hydroxide with 500 cc. of isopropyl alcohol and removing the water produced in the reaction by azeotropic distillation, was added to 100 grams of alpha nitratoisobutyric acid dissolved in isopropyl alcohol. The alcoholic solution was then refluxed for about five hours. Upon completion of the refluxing, the potassium nitrate was filtered off. The solution was then made alkaline by adding aqueous alkali and the isopropyl alcohol was removed by distillation. The residual aqueous solution was then acidified and extracted with ethyl ether. This extract was then distilled, yielding a mixture of alpha isopropoxyisobutyric acid and alpha hydroxyisobutyric acid. A yield of 30 percent of alpha isopropoxyisobutyric acid based on alpha nitratoisobutyric acid was obtained. The above reaction proceeded as follows:

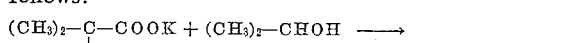
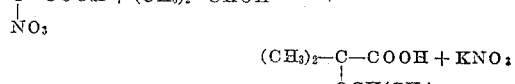

The process set forth for the conversion of alpha nitratoisobutyric acid is equally applicable to the conversion of other alpha nitratocarboxylic acids. Thus, according to the present invention, it is possible to convert alpha nitratocarboxylic acids such as, for example, alpha nitratolactic acid, to alpha alkoxy carboxylic acids and derivatives thereof.

As shown above, the conversion of alpha nitratocarboxylic acids to alpha alkoxy carboxylic acids is carried out by reacting, at elevated temperatures, a suitable alpha nitrato acid and an alcohol. It has been found that the reaction proceeds more smoothly when a metal salt of the alpha nitrato acid is employed. This salt may be readily prepared by adding a suitable metal hydroxide (e. g., alkali metal hydroxides) to an alcohol solution of the alpha nitrato acid. Example I illustrates the direct preparation and use of a salt of the alpha nitrato acid, while Example II illustrates the use of an alcoholate (alkoxide) to prepare the salt of the alpha nitrato acid. It should be noted that the reaction between an alcoholate (i. e., an alcohol in which a hydroxy hydrogen is replaced) and an acid occurs instantaneously when they are mixed so that in Example II what in effect initially took place was:

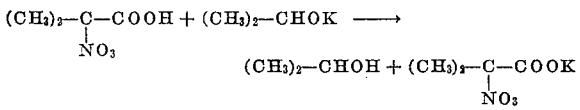

Thus, when an alcoholate is initially employed, it immediately produces a salt of the alpha nitrato acid. Therefore, it is considered that the alcoholate system is essentially the same as the acid salt system. Although only potassium has been utilized in the above examples, other metal salts, such as sodium and the like, of the alpha nitrato acid and alcohol may be employed. However, the particular metal salt employed is preferably such that the metal therein is capable of forming a nitrate which is substantially insoluble in the alcohol present. This is most advantageous since it permits the use of simple product separation techniques which greatly add to the economy of operation and commercial attractiveness of the process.

The alcohol to be reacted with the alpha nitratocarboxylic acid is present during the reaction in at least the stoichiometric amount required to convert the alpha nitrato acid into the corresponding alpha alkoxy carboxylic acid. However, better results have been obtained when the alcohol is present in excess over the required amount, since it not only reacts with the alpha nitrato acid but it also serves as a convenient solvent for the reaction.

Aliphatic alcohol, particularly primary and secondary alcohols, such as are illustrated, and aromatic alcohols may be employed in the reaction. Thus, for example, alcohols such as methanol, ethanol, propanol, isopropanol, isobutanols, benzyl alcohol and the like are suitable for reaction with alpha nitrato carboxylic acids.

The reaction is carried out at elevated temperatures and in particular at temperatures which are at or above the boiling point of the particular alcohol employed in the reaction. The time of reaction may be varied so that, for example, somewhat shorter periods than those given in the examples are satisfactory.

In connection with the esterification of an alpha alkoxy carboxylic acid, it should be pointed out that several other methods of ester preparation other than that illustrated may be employed. For example, U. S. Patent 2,525,249 illustrates several suitable alternative methods of ester preparation. Likewise, many esters of the alpha alkoxy carboxylic acid and methacrylic acid may be made by utilizing an alcohol different from methanol. Examples of such alcohols are the aliphatic alcohols ethyl, propyl, butyl, etc.

Alternate methods such as those described in British Patent 584,607 and Journal American Chemical Society 70, 1153 (1948), may also be employed, in addition to that illustrated, to convert an ester of alpha alkoxy carboxylic acid into a corresponding alpha unsaturated ester by dealkoxylation.

Since certain changes may be made in the above process without departing from the scope of the invention herein involved, it is intended that all matter contained in the above description shall be interpreted as illustrative and not in a limiting sense.

What is claimed is:

1. The process of forming an alpha alkoxy isobutyric acid which comprises reacting at elevated temperatures a salt of alpha nitratoisobutyric acid with an alcohol, the metal of said salt being such as to form a nitrate which is substantially insoluble in the alcohol.

2. The process of forming an alpha alkoxy isobutyric acid which comprises reacting at elevated temperatures a salt of alpha nitratoisobutyric acid with an alcohol.

3. The process of claim 2 wherein said salt of alpha nitratoisobutyric acid is an alkali metal.

4. The process of forming alpha methoxyisobutyric acid which comprises reacting a salt of alpha nitratoisobutyric acid with methanol at elevated temperatures.

5. The process of claim 4 wherein said salt is potassium alpha nitratoisobutyrate.

6. The process of forming alpha isopropoxyisobutyric acid which comprises reacting a salt of alpha nitratoisobutyric acid with isopropanol at elevated temperatures.

7. The process of claim 6 wherein said salt is potassium alpha nitratoisobutyrate.

References Cited in the file of this patent

UNITED STATES PATENTS

| 2,356,247 | Kirk et al. | Aug. 22, 1944 |
| 2,525,353 | Himel | Oct. 10, 1950 |
| 2,542,985 | Bond | Feb. 27, 1951 |

OTHER REFERENCES

Haitinger: Ann. Chim. (Liebig) 193 (1878), page 382.
Klemenc: Chem. Abst. 42 (1948), page 6221i.
Levy et al.: J. Chem Soc. (London) 1948, page 54.
Groggins: "Unit Processes," 4th ed. (1952), pages 425–6.